Patented May 6, 1930

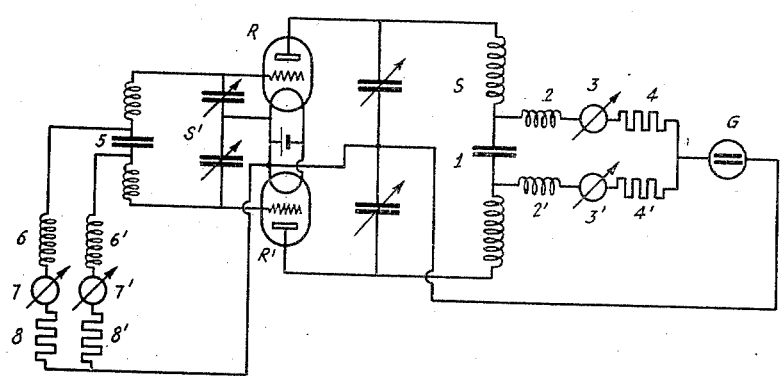

1,757,467

UNITED STATES PATENT OFFICE

WILHELM MOSER, OF BERLIN, GERMANY, ASSIGNOR TO GESELLSCHAFT FÜR DRAHT-LOSE TELEGRAPHIE M. B. H., OF BERLIN, GERMANY, A CORPORATION OF GERMANY

ARRANGEMENT FOR WIRELESS TELEGRAPHY AND TELEPHONY

Application filed December 29, 1927, Serial No. 243,251, and in Germany February 5, 1927.

It has been found in practice that when using a plurality of thermionic tubes connected in a push-pull circuit for transmission work, difficulties as regards wave generation arise on account of unequal conditions existing in the different tubes. It has been found that the dissimilar operation of the tube is partly due to the fact that the load resistance of the different tubes is the same and that it would be more suitable to employ different load resistances for the different tubes.

The purpose of the present invention is to provide a circuit arrangement wherein the plate circuits of the tubes are separated so far as the direct current is concerned, so that the direct current component of the plate currents is made to flow each by way of a distinct resistance.

Still another purpose of the invention is to provide means for separating the discharge currents of the grid circuits in a somewhat similar manner.

In the drawing the single figure represents diagrammatically a circuit arrangement based upon the underlying idea of the invention.

In said figure, the tubes R and R' are connected according to the push-pull principle. The common oscillation circuit S comprises a blocking condenser 1 which divides the self-inductance coil of the oscillation circuit into two equal parts, the currents supplied from the direct current generator G being fed to the terminals thereof; that is, for the tube R by way of a choke-coil 2, a measuring instrument 3 and an ohmic resistance 4, and for the tube R' by way of a choke coil 2', a measuring instrument 3' and a resistance 4'.

The grid oscillation circuit S' comprises a blocking condenser 5 to which the grid direct current circuits of both tubes are brought, one of said grid direct current circuits containing a choke-coil 6, a measuring instrument 7 and an ohmic resistance 8, and the other one similarly a choke-coil 6', a measuring instrument 7', and a resistance 8'.

Having thus described my invention what I desire to protect by Letters Patent is:

1. In an amplifier circuit, a plurality of vacuum tubes arranged in push pull, an input circuit and an output circuit, said output circuit including an inductance coil, a condenser circuit for dividing said coil into two equal parts, a potential source and means comprising a pair of conducting branches for connecting said potential source to both sides of said condenser, each of said branches including a choke coil and a resistance in series, the value of the resistance in each of said branches being so chosen that operating conditions in all of the vacuum tubes will be approximately constant.

2. A push pull amplifier circuit having an output circuit and an input circuit one of said circuits including a pair of inductances and a condenser connected therebetween and in series therewith, a source of potential and means comprising a separate circuit including a choke coil and a resistance for connecting each side of said condenser to said source the value of said resistance being so chosen that conditions in each of the tubes of said push pull amplifier are equalized.

3. A push pull amplifier circuit having an output circuit and an input circuit said output circuit including a pair of inductances and a condenser connected therebetween and in series therewith, a source of potential and means comprising a separate circuit including a choke coil and a resistance for connecting each side of said condenser to said source the value of said resistance being so chosen that conditions in each of the tubes of said push pull amplifier are equalized.

4. In an amplifier circuit, a plurality of vacuum tubes arranged in push pull, an input and an output circuit said output circuit including an inductance coil and a condenser adapted to divide said coil into two equal parts a potential source and means comprising a pair of conducting branches for connecting said potential source to both sides of said condenser each of said branches including a choke coil and a resistance in series, said input circuit comprising a pair of inductances and a condenser connected therebetween and in series therewith means comprising a separate circuit including a choke coil and a resistance for connecting each side of said condenser to said source the value of each of said resistances in said branches being so chosen that operating conditions in all of the vacuum tubes will be approximately constant.

WILHELM MOSER.